United States Patent [19]
Nemoto

[11] Patent Number: 6,032,259
[45] Date of Patent: Feb. 29, 2000

[54] SECURE NETWORK AUTHENTICATION SERVER VIA DEDICATED SERIAL COMMUNICATION PATH

[75] Inventor: Kazuo Nemoto, Kawasaki, Japan

[73] Assignee: International Business Machines Corporation, Armonk, N.Y.

[21] Appl. No.: 09/013,849

[22] Filed: Jan. 27, 1998

[30] Foreign Application Priority Data

May 16, 1997 [JP] Japan ................................ 9-127079

[51] Int. Cl.[7] ............................ G06F 11/00; G06F 12/14; G06F 13/00
[52] U.S. Cl. ........................ 713/201; 713/200; 713/202
[58] Field of Search ................................ 713/200, 201, 713/202

[56] References Cited

U.S. PATENT DOCUMENTS

| | | | |
|---|---|---|---|
| 4,949,333 | 8/1990 | Gulick et al. ........................... | 370/282 |
| 5,623,601 | 4/1997 | Vu ............................................ | 713/201 |
| 5,720,035 | 2/1998 | Allegre et al. .......................... | 709/225 |
| 5,781,550 | 7/1998 | Templin et al. ........................ | 370/401 |
| 5,805,803 | 9/1998 | Birrell et al. ........................... | 713/201 |
| 5,805,820 | 9/1998 | Bellovin et al. ......................... | 360/62 |
| 5,838,747 | 11/1998 | Matsumoto .............................. | 375/370 |
| 5,889,863 | 3/1999 | Weber ....................................... | 380/25 |

*Primary Examiner*—Robert W. Beausoliel, Jr.
*Assistant Examiner*—Bryce Bonzo
*Attorney, Agent, or Firm*—Jeanie S. Ray-Yarletts

[57] ABSTRACT

To improve security in a networking environment an external network 102 is connected through an outside host 104. This host 104 implements a first connection program 112 for providing network security. Further, the outside host is connected to an inside host 106 via a dedicated transmission path 116. The inside host implements a second connection program 114 as well. The first and second connection programs 112 and 114 each comprises a program at the application level and a driver program for driving the dedicated communication path. By virtue of restricted communication between the two connection programs only, it is possible to prevent invasion from the outside world. Further, it is also possible to prevent access to another portion in the system.

15 Claims, 8 Drawing Sheets

SECURE NETWORK AUTHENTICATION SERVER VIA DEDICATED SERIAL COMMUNICATION PATH

BACKGROUND OF THE INVENTION

This invention relates to a computer connected to a network and, more particularly, to a network security system for use therein to prevent invasion into an internal system that requires keeping secrecy from a network hacker.

It is known in the art to provide a firewall system within a computer system connected to an external network, such as the Internet, to prevent invasion of a network cracker. A known prior art firewall system is provided with a bastion host, which implements a firewall program, to prevent invasion of a network cracker. A dual firewall system using two bastion hosts is also known in the art.

With reference to FIGS. 7 and 8, such a prior art system using two bastion hosts will be described.

FIG. 7 shows a system connecting an internal network to an external network (i.e. the Internet) 702. To the Internet 702, the internal network is connected via a screening router 704. The screening router 704 is set up such that all traffic received from the external network 702 and destined for the internal network is routed to an outside network 706 of a bastion host 708. The screening router 704 applies filter rules to the incoming traffic before it is sent to the bastion host 708, whereby only the traffic passing the filter rules is sent to the bastion host 708.

The outside network 706 forms a Demilitarized Zone (DMZ). The outside network 706 is not protected by the bastion host 708 that implements a firewall. Traffic from the external network 702 is transferred to a private network 710 via the outside bastion host 708. Since the private network 710 keeps secrecy to some extent by means of the firewall, those hosts to be accessed from the outside world as well as internal hosts which do not require strict secrecy can be positioned at this level.

Other hosts requiring stricter security are connected to an inside network 714, which is connected to the private network 710 via an inside bastion host 712 that implements a firewall. Since the inside network 714 is protected by the dual firewall, those hosts adapted for providing highly secret items (for example, keys for electronic signatures) can be connected thereto.

While in the inside network as described above, secrecy is kept in a stricter manner by means of the dual firewall, it fails to provide any special function associated with such dual firewall and, thus, there exists limitation as far as conventional firewall programs are used, This is due to the fact that the firewall programs are complex and executed at the application level. FIG. 7 shows such a situation. That is, traffic from the external network 702 is transferred to the outside bastion host 708 via the screening router 704. Then, it is transferred again to the inside network 714 via the inside bastion host 712. In the bastion hosts 708 and 712, firewall programs 716 and 718 are implemented at the application layer to prevent invasion of a network hacker.

Implementation at the lower layers is done at the same levels as a conventional operating system (OS). This portion looks like a black box to a user. Thus, even if there exists in this portion a security hole for access from a network hacker, an ordinary user cannot recognize such a security hole, or should the user notice such a security hole, it would be too late to take any actions.

By way of example, a security hole may be due to an OS bug, hardware faults, setup misses of various software parameters and the like. In case a fault associated with an external access occurs due to these causes, a stuck-open fault (forcing the involved entity to be inoperable) does not raise any serious problem, but a stuck-at fault (forcing the involved entity to pass through data) raises a serious security problem.

Whenever a firewall server is contaminated by such a stuck-at fault or a malicious person, information such as a destination IP address, a service type and the like contained in a header of TCP/IP (a protocol of the Internet) may be possibly faked. Checking at the driver level (lower layer) has been insufficient to cope with such a problem. On the other hand, development of a firewall that is independent of an OS requires coding at the OS level, which necessitates much effort and costs if it is possible at all.

It is, therefore, an object of the present invention to provide a network security system which has a higher security level and which does not have defects in an essential portion of a firewall.

SUMMARY OF THE INVENTION

To accomplish said object, this invention is directed to a network security system for use in a system connected to an external network, comprising: a first computer for transmitting and receiving a packet with a header to and from said external network; and a second computer connected to the first computer by means of a dedicated communication path, wherein the first computer removes the header from the packet and sends the packet (without the header) to the second computer through the dedicated communication path, and wherein the first computer appends a header to the packet received from the second computer through the dedicated communication path to send the header appended packet to said external network.

Further, the dedicated communication path may be configured to support a start-stop transmission scheme.

The second computer determines whether or not the packet without the header is in a predetermined format. Additionally, the second computer may also send data contained in the received packet to a server connected to the second computer. The second computer may also process data contained in the received packet and return the processed result to the first computer.

Accordingly, it is possible to construct a security system having a higher security strength with a less complicated configuration.

DETAILED DESCRIPTION OF THE PREFERRED EMBODIMENT

Now, with reference to the drawings, an embodiment of the present invention will be described in detail.

Figure 1:
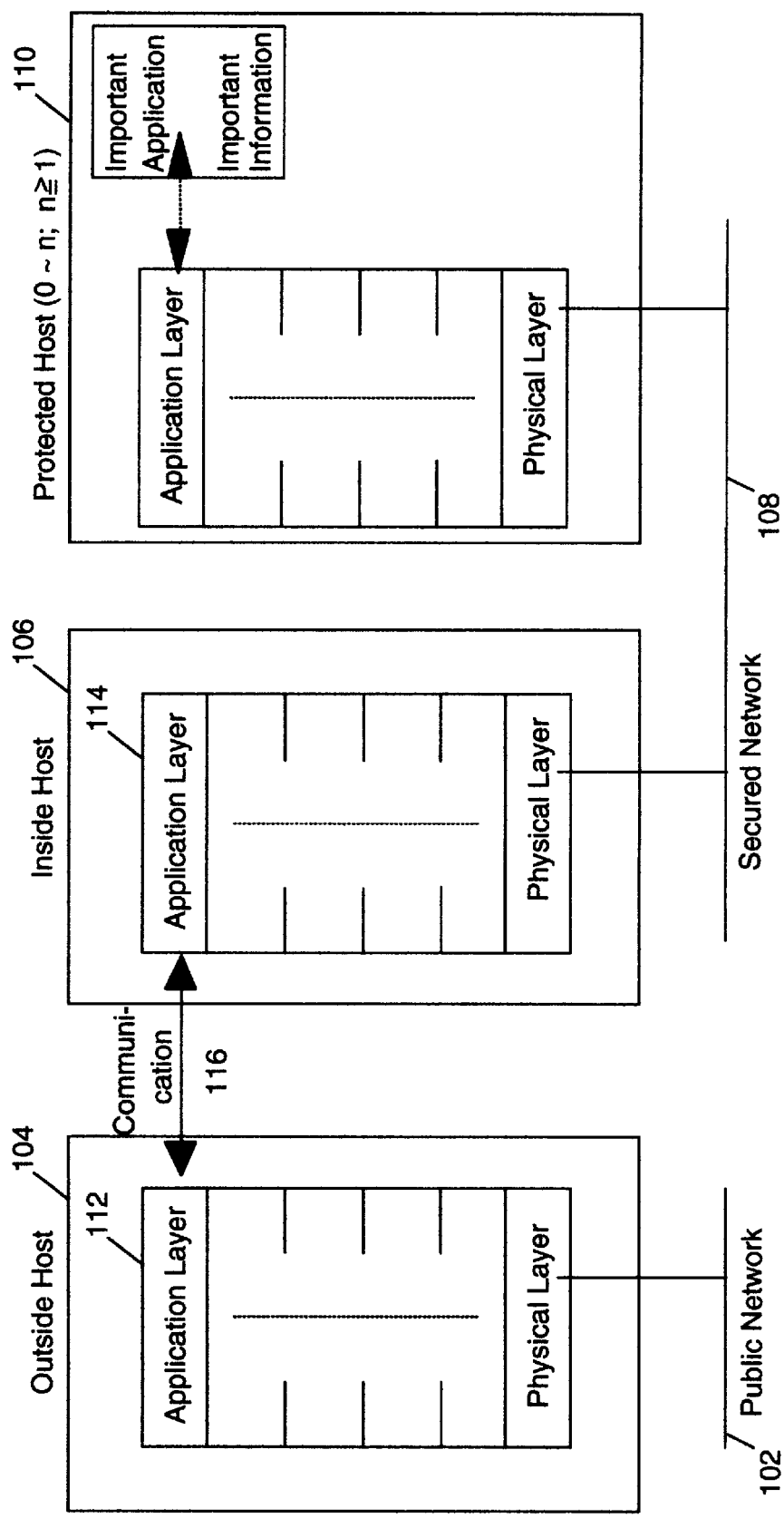
FIG. 1 is a diagram showing an embodiment of this invention.

In FIG. 1, an outside host 104 is connected to a network (public network) 102 which is readily accessible to the outside world. The outside host 104 implements a first connection program 112 for providing security for the network of this invention. Further, this outside host 104 is connected to an inside host 106 via a dedicated transmission path 116. The inside host 106 implements a second connection program 114 as well. The first and second connection programs 112 and 114 each comprises a program at the application level and a driver program for driving the dedicated communication path 116. These two connection programs communicate with each other in the form of occupying the communication path 116, thereby to prevent invasion of a network hacker (in a conventional network, such a communication path is used in a multiplexed manner rather than an exclusively occupied manner). Also, it is possible to prevent access to another portion within the system. Details of the first connection program 112 and the second connection program 114 will be described hereafter.

Since the inside host 106 has ensured security, an inside network 108 connected thereto is a secured network. Connected to this secured network 108 is a protected host 110 that has important information and is processing important applications to be protected from the invasion of a network hacker. The inside host 106, implementing the connection program 114, may serve as the protected host 110 too. In this case, there may be no need to separately provide a protected host connected to the internal secured network 108.

Figure 2:
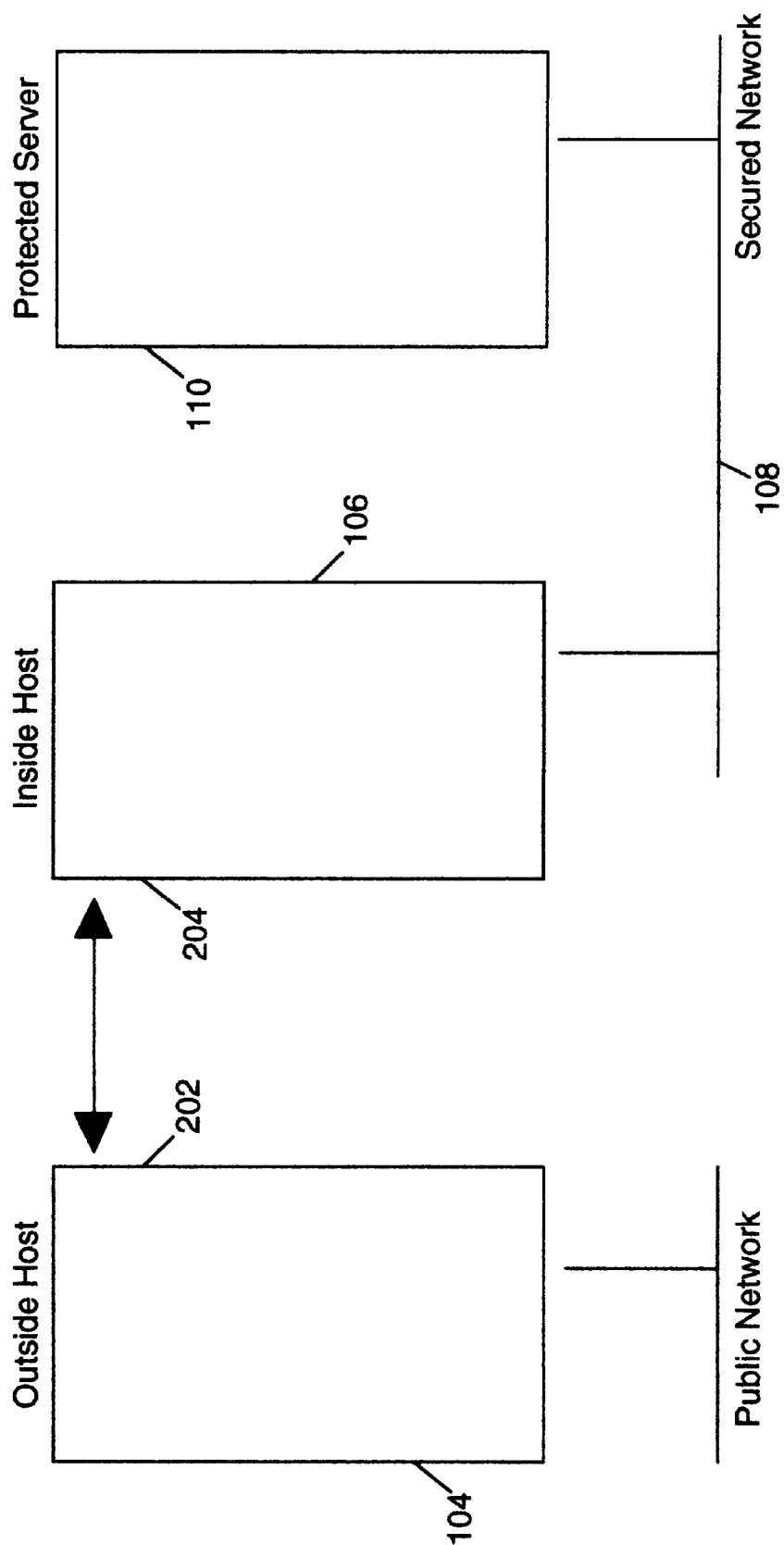
FIG. 2 is a block diagram showing an embodiment of this invention.

Now, with reference to FIG. 2, the connection programs 112 and 114 will be described in further detail. FIG. 2 illustrates an example where the hosts, connected through bi-directional serial ports, are communicating with each other using a start-stop transmission scheme. In FIG. 2, the outside host 104 and the inside host 106 are connected through the serial ports 202 and 204. The serial ports 202 and 204 are dedicated to the two connection programs such that each of these ports is physically accessed by a dedicated serial port device driver contained in its associated connection program. As described, the protected host 110 (which may serve as a authentication server or the like to be accessed from the outside world) is connected through a dedicated connection to the outside world via the secured network 108 such that the connection programs perform sufficient checking before allowing access to the protected host. Hence, it is possible to ensure sufficient security.

Since the serial port device drivers for accessing the dedicated serial ports are simple in configuration, they may be independently created or standard drivers may be used (after appropriate testing). Therefore, this connection is inaccessible to the outside world, and is not manipulable even by a privileged user of the outside host 104. Further, since dedicated device drivers are used, there is no access hole due to an OS bug or the like as seen in the conventional firewall. Note that if the dedicated connection programs, the dedicated ports and/or the connection line are broken, such failures will always result in an inoperable condition because these entities are distributed at two separate locations.

Further, using the connection by these ports exclusively for connecting to a specific server, such as an authentication server 110 for issuing decryption keys, to be accessed from the outside world, there is no need to provide any destination information, and yet it becomes possible to perform unique checking associated with access to the authentication server 110, thereby strengthening secrecy.

As described above, when the first connection program 112 is solely used for the authentication server 110, its destination (authentication server) is fixed and no congestion control is needed (no access to another entity exists) and, therefore, all that is required is to send data alone with a minimum amount of control information (for example, parity bits or the like) appended thereto. Further, in such a case where it is dedicated to the authentication server 110, an amount of data to be communicated is kept small and, thus, there is no need to use a high data transfer rate.

Figure 3:
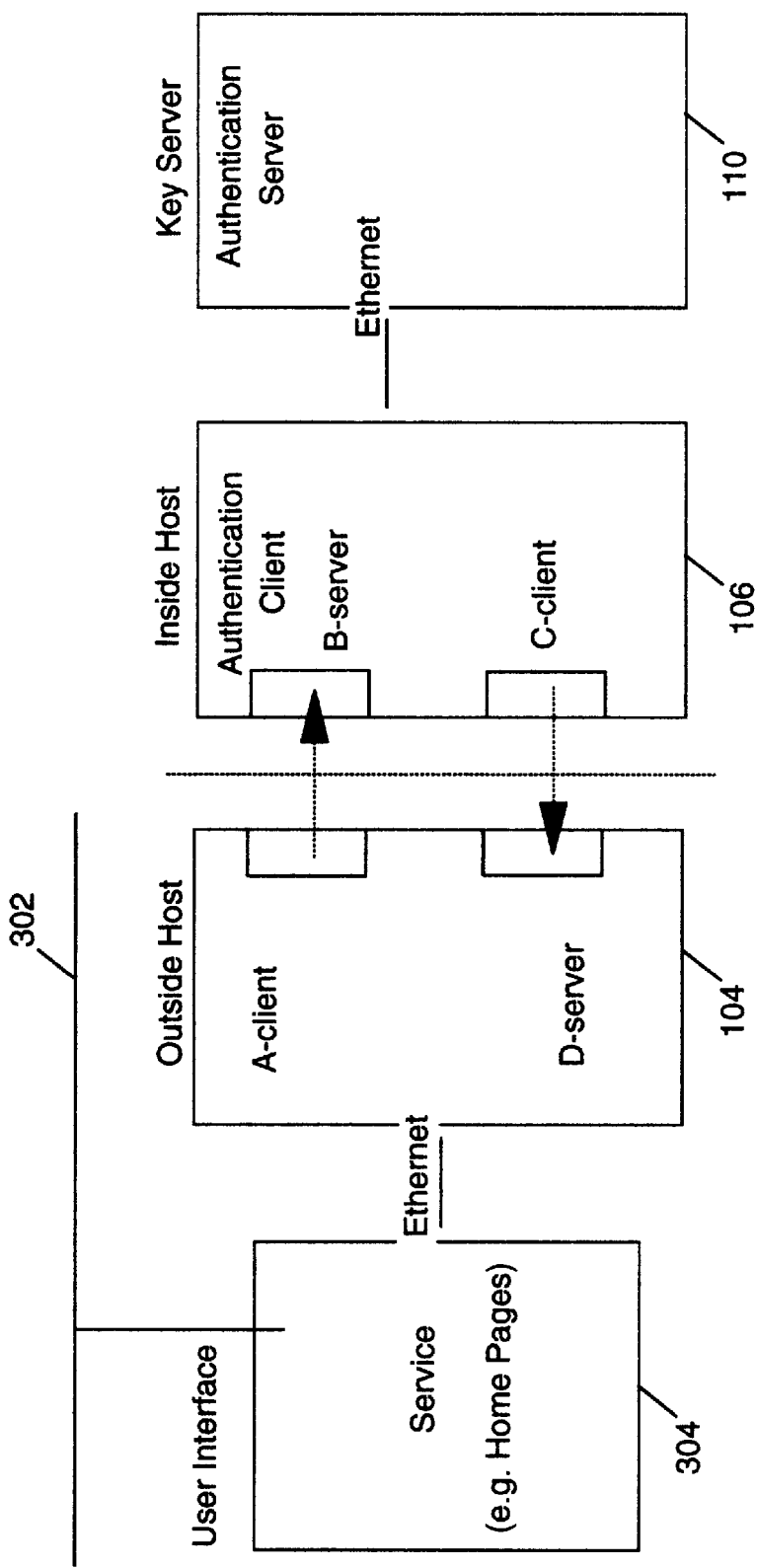
FIG. 3 is a block diagram showing an embodiment of this invention in further detail.
Figure 4:
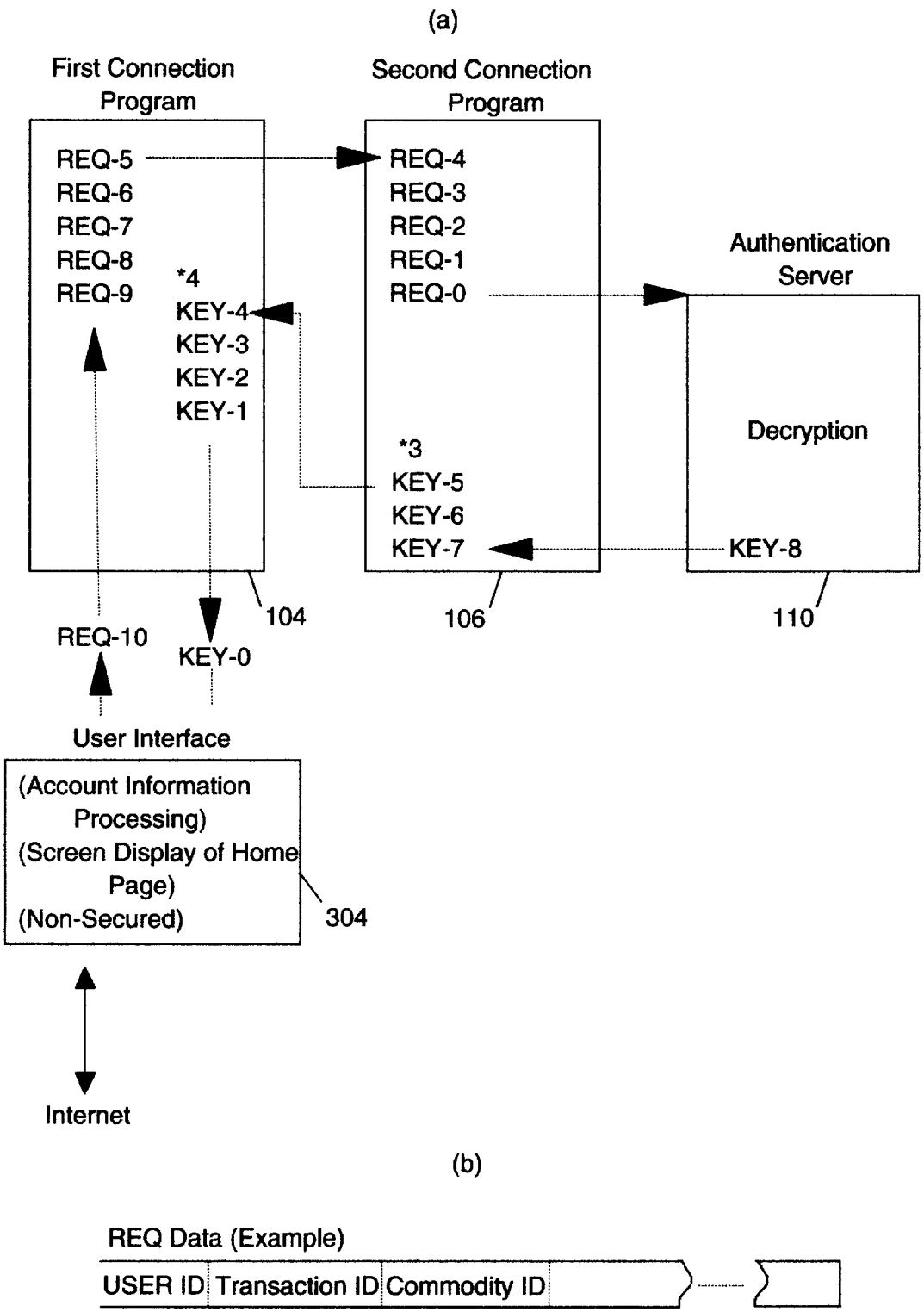
FIG. 4 is a block diagram showing data flow in an embodiment of this invention.

Now, with reference to FIGS. 3 and 4, operations of the first and second connection programs will be described in further detail. In FIGS. 3 and 4, there are shown operations for dedicated communication to and from the authentication server 110 issuing decryption keys.

FIG. 3 shows a structure in which the first and second connection programs are implemented in the outside host 104 and the inside host 106. The outside host 104 is connected to a user interface machine 304. The user interface machine 304 is connected to an external network 302, and it provides a user interface for accessing home pages or the like to an outside access requester.

The first and second connection programs have an "A-client" and a "C-client" as senders, and a "B-server" and a "D-server" as receivers respectively.

The A-client of the outside host 104 receives a packet, having a TCP/IP header, which is transferred from the user interface machine 304 connected to the external network 302. Next, the A-client removes the header from the packet, converts the resultant data alone into the start-stop data, and sends it to the B-server of the inside host 106 via the serial ports. The B-server, which serves as an authentication client of the authentication server 110, sends the received data to the authentication server 110 which is a program for managing keys.

If the authentication server 110 determines that the received data represents a valid key issuance request, it issues a decryption key and sends the key data to the inside host 106 as the authentication client. The C-client of the receiving second connection program sends the key data as start-stop data to the D-server of the outside host 104 via the serial ports. The receiving D-server appends a header required for the protocol and, then, sends the key data to the user interface machine 304. While communication between the inside host 106 and the authentication server 110 is carried out in a conventional manner, if a header in accord with the protocol is required, such a header will be appended by the B-server in the inside host 106, whereas such a header will be removed by the D-server.

Now, with reference to FIG. 4, processing of the first and second connection program, with emphasis on data flow, will be described in further detail.

In connection with FIG. 4, it is assumed that a user who has used a trial version of a program is to obtain, via the Internet, a decryption key for decrypting an encrypted final version of the program contained in a CD-ROM or a tape.

To obtain such a decryption key at the user interface machine 304, the user accesses a WWW page via the Internet and enters a given user ID or the like in accordance with indications on a screen. As a result, the REQ data is then sent from the user interface machine 304 to the outside host 104. An exemplary form of the REQ data is shown in FIG. 4(b). Upon receipt of the REQ data, the first connection program of the outside host 104 removes a header from a received packet and enters the packet into its own queue. The first connection program derives the REQ data from the queue in the order of receipt and sends the REQ data to the second connection program of the inside host 106 via the serial ports. And, with respect to those REQ data in the queue which have been already sent, flags are set to indicate that their keys are being created.

Upon receipt of the REQ data, the second connection program checks the data fields, that is, it checks formality to determine whether or not each of the User ID, Transaction ID, Commodity ID, as shown in FIG. 4(b), has a predetermined attribute (for example, type of characters such as numeric, the number of digits). If they are correct, it enters them into its own queue. If not, it informs the first connection program via the serial ports of the incorrectness.

The second connection program of the inside host 106 sends the formally correct REQ data to the authentication server 110, and sets flags to indicate that their keys are being created.

The authentication server 110 validates the received REQ data and, if validated, issues a key and sends the data of the issued key to the inside host 106. If the authentication server cannot issue any keys as a result of the validation process, it returns a message to indicate that the key cannot be issued.

Upon receipt of the key data, the second connection program of the inside host 106 removes the REQ data that has its associated flags set. The received key data is then sent to the outside host 104 via the serial ports. If there is no response to the sent REQ data within a given time period, that REQ data is resent to the authentication server 110.

When the first connection program of the outside host 104 receives the key data from the second connection program via the serial ports, it deletes the associated REQ data, appends a necessary header to the key data and sends it to the user interface machine 304. Unnecessary negotiation is not carried out between the outside host 104 and the inside host 106. This is because such a negotiation causes any interface protocol between them to be complex, thereby to degrade security strength.

While, in the above embodiment, data checking is done by the second connection program on the inside host, it may be done by the fist connection program as well.

The inside host 106 may also be used as the authentication server 110. In this case, the inside host 106 may be provided with a program for the authentication server 110. Also, in this case, the second connection program on the inside host may send the received data to its own authentication server program, rather than sending the received data to the authentication server 110. The outside host may also be used as the user interface machine.

Figure 5:
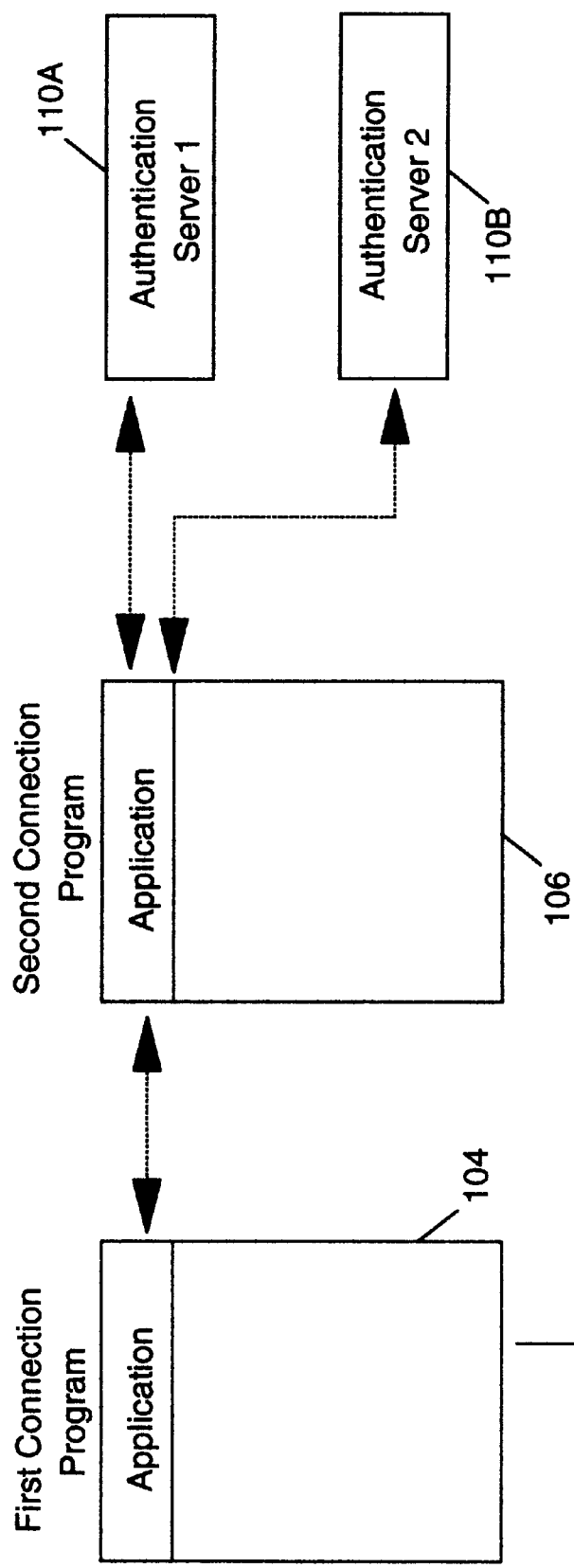
FIG. 5 is a block diagram showing an embodiment of this invention in further detail.

While in the above description in regard to FIGS. 2 through 4, it is assumed that there is only one authentication server, it is possible to use two or more authentication servers as shown in FIG. 5. In this case, it is necessary for the second connection program to specify the destination of the REQ data by means of the Commodity ID, for example.

Figure 6:
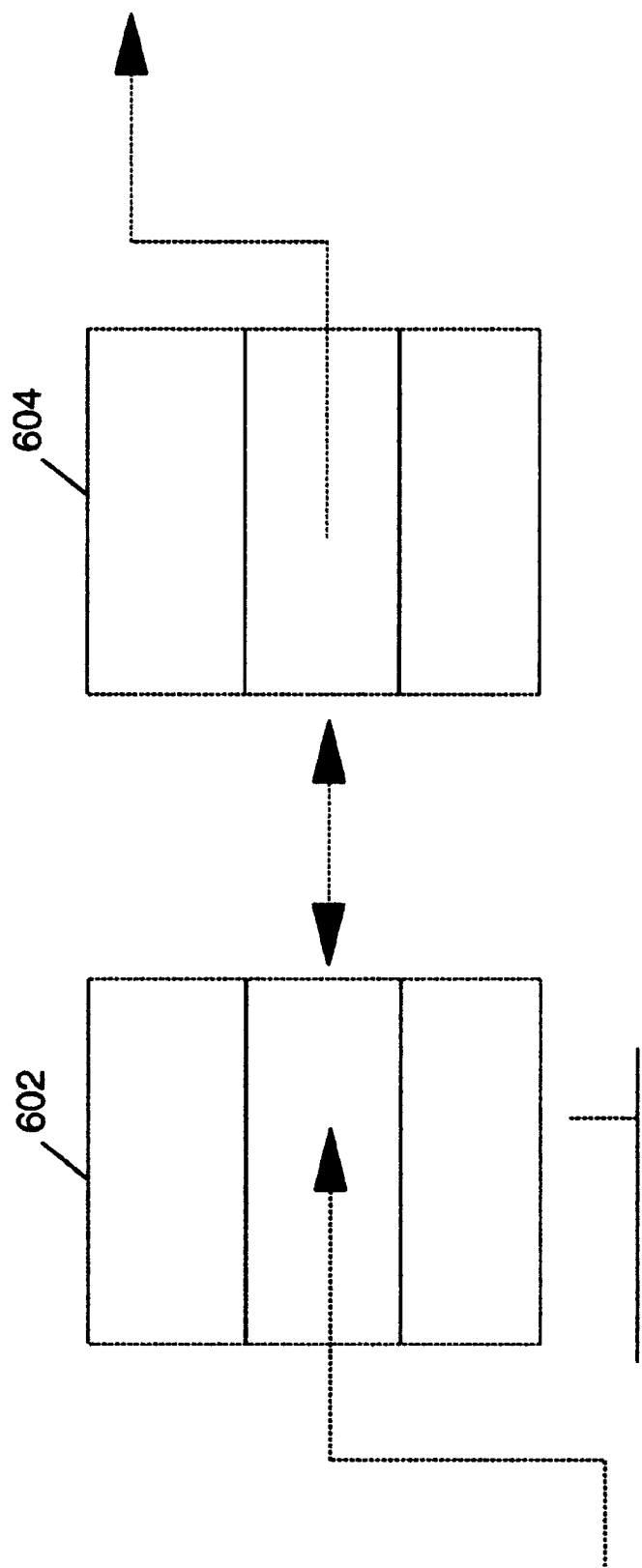
FIG. 6 is a block diagram showing an embodiment of this invention in further detail.
Figure 7:
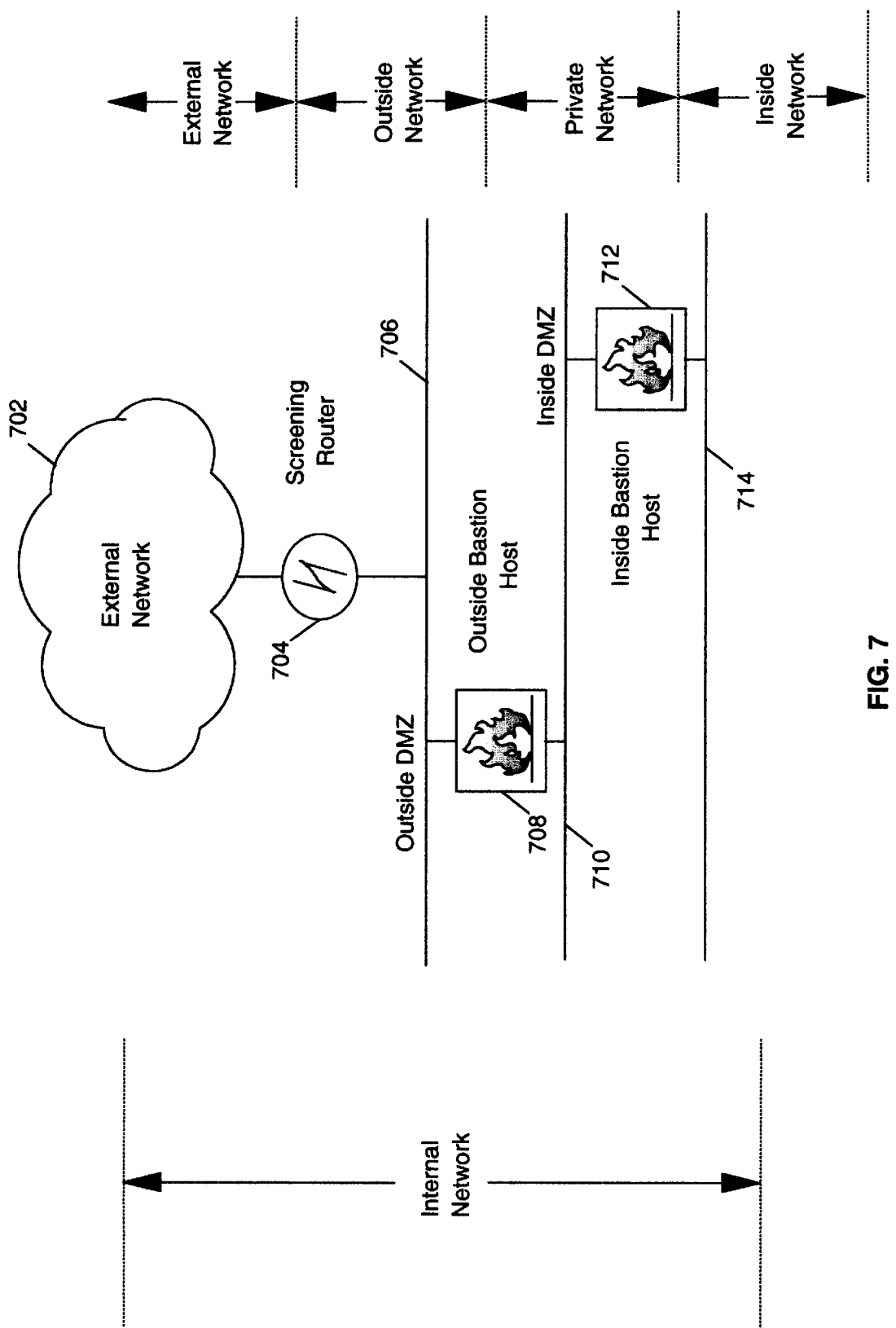
FIG. 7 is a diagram showing a conventional security system (Prior Art).
Figure 8:
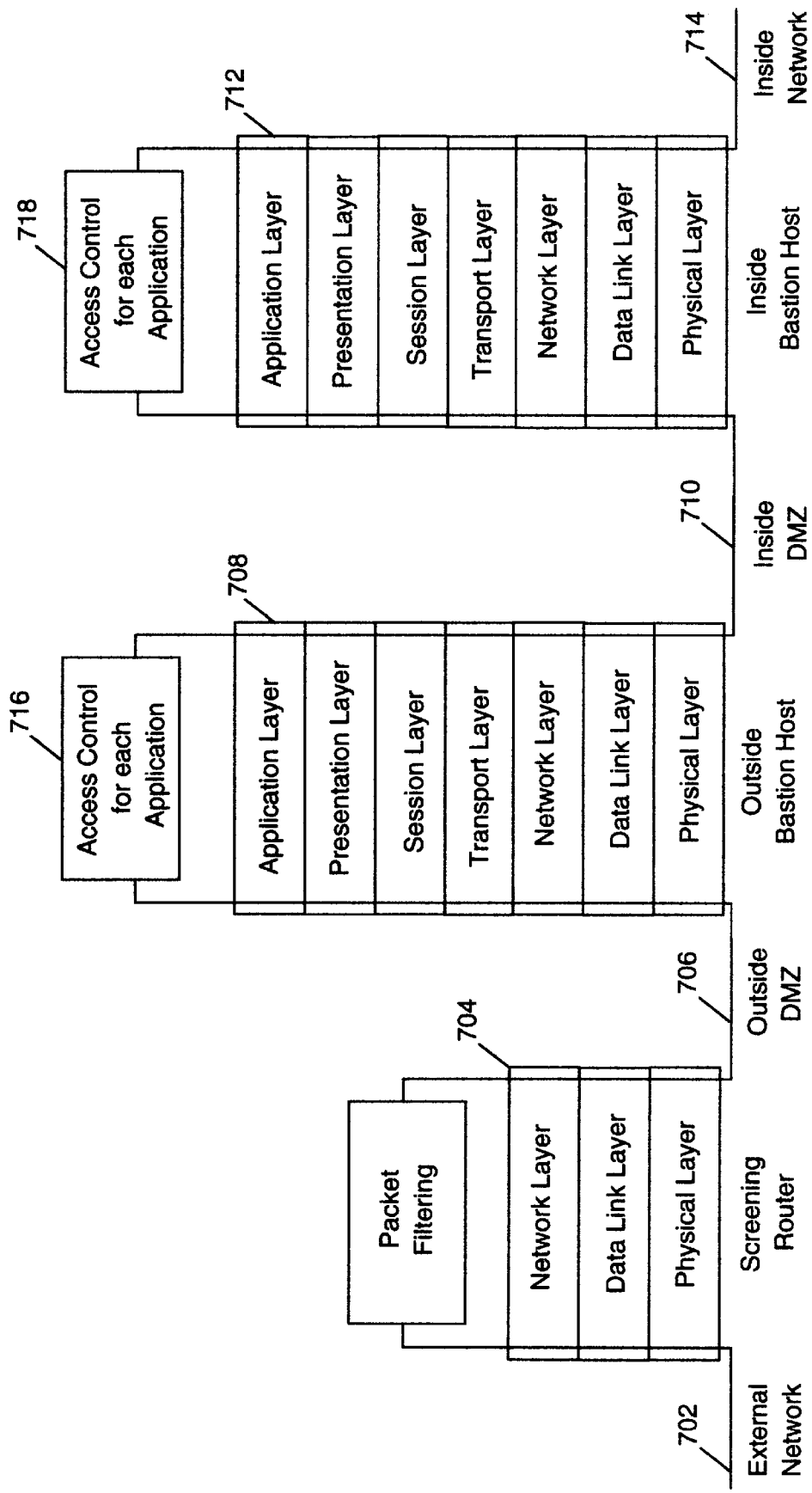
FIG. 8 is a diagram showing a conventional security system (Prior Art).

Further, as shown in FIG. 6, by using the aforementioned connection scheme, it is possible to make an arrangement adapted for transmitting and receiving at the middle of the protocol layer. In so doing, it becomes possible to interpret the protocol by the two host machines 602 and 604, thereby to improve the security strength.

With regard to the functional portion of said program, it may be stored on a recording medium and read out by a computer system to practice this invention. Such a recording medium includes a floppy disk, a CD-ROM, a magnetic tape, a ROM cassette or the like.

As described above, by making use of the inventive configuration, it is possible to construct in a computer system connected to an external network, a security system having a higher security strength with a simple configuration.

What is claimed is:

1. A network security system for use in a system connected to an external network, said network security system comprising:
   a first computer for transmitting and receiving a first packet to and from said external network; and,
   a second computer connected to said first computer by means of a dedicated communications path,
   wherein said first computer removes a header from said first packet and sends the remaining first packet to said second computer through said dedicated communication path, and wherein said first computer appends a header to a second packet received from said second computer through said dedicated communication path to send the second packet and header to said external network.

2. The network security system as set forth in claim 1, wherein said dedicated communication path is configured to support a start-stop transmission scheme.

3. The network security system as set forth in claim 1 or 2, wherein said second computer determines whether said first packet is in accord with a predetermined format.

4. The network security system as set forth in claim 1 or 2, wherein said second computer sends data contained in said first packet received to a server connected to said second computer.

5. The network security system as set forth in claim 1 or 2, wherein said second computer processes data contained in said first packet received and send the processed result to said first computer.

6. A method of securely transmitting information within an internal network wherein said internal network is connected to an external network by a first computer, said first computer connected to a second computer by means of a dedicated communications path, said method comprising the steps of:
   receiving, at said first computer, a packet from said external network;
   removing, at said first computer, a header from said packet and sending a resulting headerless packet to said second computer through said dedicated communication path; and,
   wherein said first computer appends a header to any subsequent information received from said second computer through said dedicated communications path.

7. The method as claimed in claim 6 wherein said dedicated communicating path is configured to support a start-stop transmission mechanism.

8. The method as claimed in claim 6 wherein said second computer determines whether said packet is in accord with a predetermined format.

9. The method as claimed in claim 6 wherein said second computer sends data contained in said packet received to a server connected to said second computer.

10. The method as claimed in claim 6 wherein said second computer processes data contained in said packet and sends results of said processing to said first computer.

11. A computer program residing on programmable media for securely transmitting information within an internal network wherein said internal network is connected to an external network by a first computer, said first computer connected to a second computer by means of a dedicated communications path, said method comprising the steps of:

programmably receiving, at said first computer, a packet from said external network;

programmably removing, at said first computer, a header from said packet and sending a resulting headerless packet to said second computer through said dedicated communication path; and, wherein said first computer programmably appends a header to any subsequent information received from said second computer through said dedicated communications path.

12. The computer program as claimed in claim 11 wherein said dedicated communication path is configured to support a start-stop transmission mechanism.

13. The computer program as claimed in claim 11 wherein said second computer programmably determines whether said packet is in accord with a predetermined format.

14. The computer program as claimed in claim 11 wherein said second computer sends data contained in said packet received to a server connected to said second computer.

15. The computer program as claimed in claim 11 wherein said second computer processes data contained in said packet and programmably sends results of said processing to said first computer.

* * * * *